(12) United States Patent
Giorgio Bort et al.

(10) Patent No.: US 11,255,429 B2
(45) Date of Patent: Feb. 22, 2022

(54) SERIES HYDRAULIC HYBRID SYSTEM FOR A VEHICLE AND METHOD OF OPERATING A SERIES HYDRAULIC HYBRID SYSTEM FOR A VEHICLE

(71) Applicant: DANA ITALIA S.R.L., Arco (IT)

(72) Inventors: Carlos Maximiliano Giorgio Bort, Levico Terme (IT); Davide Moser, Trento (IT); Giulio Ornella, Arco (IT)

(73) Assignee: DANA ITALIA S.R.L., Arco (IT)

( * ) Notice: Subject to any disclaimer, the term of this patent is extended or adjusted under 35 U.S.C. 154(b) by 121 days.

(21) Appl. No.: 16/308,617

(22) PCT Filed: Jun. 12, 2017

(86) PCT No.: PCT/EP2017/064320
§ 371 (c)(1),
(2) Date: Dec. 10, 2018

(87) PCT Pub. No.: WO2017/216120
PCT Pub. Date: Dec. 21, 2017

(65) Prior Publication Data
US 2019/0270369 A1    Sep. 5, 2019

(30) Foreign Application Priority Data

Jun. 13, 2016 (EP) .................................. EP16425052

(51) Int. Cl.
*F16H 61/4078* (2010.01)
*B60K 6/12* (2006.01)
(Continued)

(52) U.S. Cl.
CPC ........... *F16H 61/4078* (2013.01); *B60K 6/12* (2013.01); *B62D 5/06* (2013.01); *F16H 61/4096* (2013.01);
(Continued)

(58) Field of Classification Search
CPC ........ F15B 2211/7135; F15B 2211/212; F16H 61/4078; E02F 9/2242; F16H 61/4096
(Continued)

(56) References Cited

U.S. PATENT DOCUMENTS 7,444,809 B2 * 11/2008 Smith .................... E02F 9/2217
60/413
8,959,905 B2 * 2/2015 Baltes ...................... B60K 6/12
60/414
(Continued)

FOREIGN PATENT DOCUMENTS

WO    2015144349    10/2015

OTHER PUBLICATIONS

European Patent Office, International Search Report with written opinion in application PCT/EP2017/064320, dated Sep. 12, 2017, 10 pages, European Patent Office, Rijswijk Netherlands.

*Primary Examiner* — Dustin T Nguyen
(74) *Attorney, Agent, or Firm* — McCoy Russell LLP

(57) ABSTRACT

A series hydraulic hybrid system for a vehicle may have: a hydraulic circuit with a first hydraulic displacement unit in fluid communication with a second hydraulic displacement unit, a hydraulic actuator, and a hydraulic accumulator assembly. The hydraulic accumulator assembly is selectively in fluid communication with the hydraulic circuit via at least one controllable circuit valve. The hydraulic accumulator assembly is selectively in fluid communication with the hydraulic actuator via at least one controllable actuator valve, such that the hydraulic accumulator assembly is configured to be selectively fluidly connected with and to be selectively fluidly disconnected from the hydraulic actuator via the at least one actuator valve independently of a control position of the at least one circuit valve. A method of operating the system is also described.

13 Claims, 1 Drawing Sheet

(51) Int. Cl.
 *B62D 5/06* (2006.01)
 *F16H 61/4096* (2010.01)
(52) U.S. Cl.
 CPC ............... *F15B 2211/20576* (2013.01); *F15B 2211/212* (2013.01); *F15B 2211/7142* (2013.01); *F15B 2211/88* (2013.01)
(58) Field of Classification Search
 USPC .......................................................... 701/50
 See application file for complete search history.

(56) References Cited

U.S. PATENT DOCUMENTS

| | | | | |
|---|---|---|---|---|
| 8,997,476 | B2* | 4/2015 | Brinkman | F15B 21/14 |
| | | | | 60/414 |
| 9,802,469 | B2* | 10/2017 | Ornella | B60W 10/04 |
| 9,932,993 | B2* | 4/2018 | Zhang | F15B 11/024 |
| 9,989,042 | B2* | 6/2018 | Hoxie | E02F 9/2253 |
| 10,215,199 | B2* | 2/2019 | Cosoli | F15B 1/024 |
| 10,220,697 | B2* | 3/2019 | Dousy | B60K 6/12 |
| 2011/0197576 | A1* | 8/2011 | Wada | F15B 1/02 |
| | | | | 60/413 |
| 2012/0240564 | A1* | 9/2012 | Wesolowski | B60K 6/12 |
| | | | | 60/327 |
| 2013/0133318 | A1* | 5/2013 | Vogl | F15B 7/006 |
| | | | | 60/327 |
| 2013/0280111 | A1 | 10/2013 | Hoxie | |
| 2013/0318955 | A1 | 12/2013 | Zhang | |
| 2014/0026550 | A1 | 1/2014 | Brinkman | |
| 2014/0033692 | A1* | 2/2014 | Nelson | B60K 6/12 |
| | | | | 60/327 |

\* cited by examiner

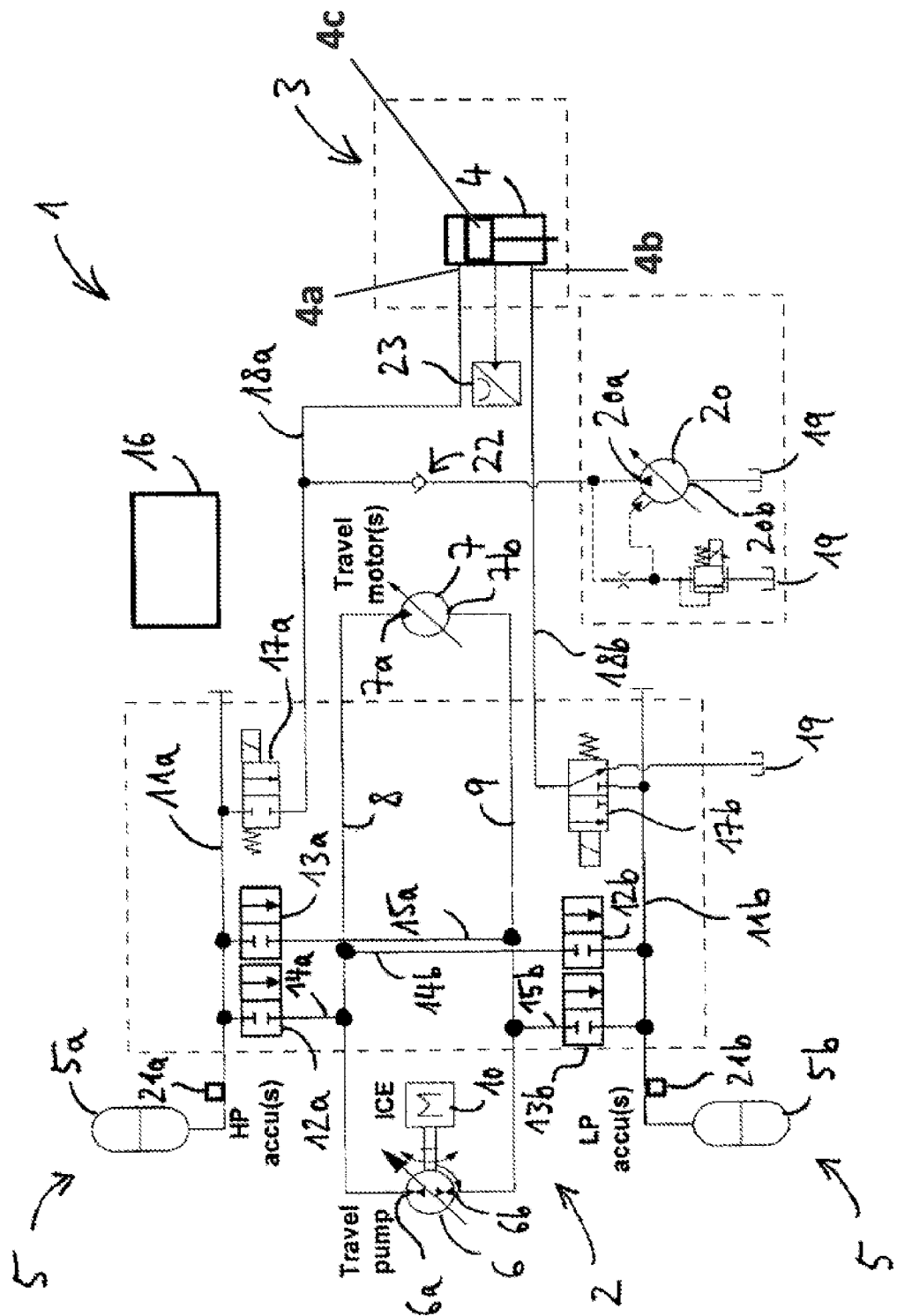

SERIES HYDRAULIC HYBRID SYSTEM FOR A VEHICLE AND METHOD OF OPERATING A SERIES HYDRAULIC HYBRID SYSTEM FOR A VEHICLE

BACKGROUND

The invention relates to a series hydraulic hybrid system for a vehicle and to a method of operating a series hydraulic hybrid system for a vehicle.

Series hydraulic hybrid systems for vehicles including a hydraulic accumulator assembly for storing hydraulic energy and for selectively injecting the hydraulic energy stored in the hydraulic accumulator assembly in a hydrostatic circuit for propelling the vehicle are generally known from the prior art.

WO2015144349A1 discloses a hydraulic hybrid driveline including a hydrostatic circuit, a hydraulic accumulator assembly and a hydraulic actuator for controlling the hydraulic displacement of a hydrostatic pump. A plurality of shuttle valves are configured to fluidly connect the hydraulic actuator with either the hydrostatic circuit or the accumulator assembly, depending on a hydraulic pressure in the hydrostatic circuit and on a hydraulic pressure in the hydraulic accumulator assembly.

Based on the prior art, the technical problem underlying the present invention consists in designing a series hydraulic hybrid system for a vehicle including a hydraulic circuit and a hydraulic actuator, wherein the system is configured to supply energy to both the hydraulic circuit and the hydraulic actuator with a preferably high degree of efficiency and under a preferably large number of different operating conditions.

SUMMARY

This object is solved by a series hydraulic hybrid system according to claim 1 and by a method of operating said system. Special embodiments are described in the dependent claims.

Thus, a series hydraulic hybrid system for a vehicle is proposed, comprising:
- a hydraulic circuit comprising a first hydraulic displacement unit in fluid communication with a second hydraulic displacement unit,
- a hydraulic actuator, and
- a hydraulic accumulator assembly;
- wherein the hydraulic accumulator assembly is selectively in fluid communication with the hydraulic circuit by means of at least one controllable circuit valve, and
- wherein the hydraulic accumulator assembly is selectively in fluid communication with the hydraulic actuator by means of at least one controllable actuator valve, such that the hydraulic accumulator assembly is configured to be selectively fluidly connected with and selectively fluidly disconnected from the hydraulic actuator by means of the at least one actuator valve independently of a control position of the at least one circuit valve.

For example, the system may comprise a first fluid connection selectively fluidly connecting the hydraulic accumulator assembly with the hydraulic circuit and a second fluid connection selectively fluidly connecting the hydraulic accumulator assembly with the hydraulic actuator, wherein the first fluid connection comprises the at least one circuit valve and wherein the second fluid connection comprises the at least one actuator valve. The first fluid connection and the second fluid connection may be arranged in parallel with respect to the hydraulic accumulator assembly, i. e. the first fluid connection does not comprise the at least one actuator valve and the second fluid connection does not comprise the at least one circuit valve.

The proposed system allows providing energy stored in the hydraulic accumulator assembly to the hydraulic or hydrostatic circuit and to the hydraulic actuator with high efficiency and flexibility.

The first hydraulic displacement unit may include a hydraulic pump such as a hydrostatic axial piston pump. The first hydraulic displacement unit may have a variable hydraulic displacement. The first hydraulic displacement unit may be drivingly engaged or selectively drivingly engaged with an engine of the vehicle. The engine may include an internal combustion engine (ICE) or an electric engine, for example. The second hydraulic displacement unit may include a hydraulic motor such as a hydrostatic axial piston motor. The second hydraulic displacement unit may be drivingly engaged or selectively drivingly engaged with a vehicle output of the series hydraulic hybrid system. The vehicle output may include at least one of a driveshaft, a final drive, a vehicle axle and a ground engaging structure, in particular one or more wheels, for example.

The hydraulic actuator may include at least one hydraulic cylinder and/or at least one hydraulic motor.

The hydraulic accumulator assembly may include at least one hydropneumatic accumulator. For example, the accumulator or the accumulators may be configured as compressed gas accumulators. An accumulator may be pressurized by filling or by partially filling the accumulator with a hydraulic fluid such as oil, thereby compressing a quantity of gas contained in the accumulator. The gas may be an inert gas such as nitrogen. Similarly, an accumulator may be de-pressurized by letting a compressed gas contained in the accumulator expand, thereby pushing hydraulic fluid contained in the accumulator out of the accumulator and creating a fluid flow. The accumulators or at least some of the accumulators may be configured to operate at hydrostatic pressures up to a maximum operating pressure of at least 200 bar or of at least 400 bar, for example.

The at least one circuit valve may be controllable through electromagnetic forces or through hydraulic forces, for example through a pilot pressure applied to the valve.

The hydraulic accumulator assembly may be in selective fluid communication with the hydraulic circuit and with the hydraulic actuator in such a way and the at least one circuit valve and the at least one actuator valve may be controllable in such a way that the system may be selectively switched between at least three configurations. In one configuration the hydraulic accumulator assembly is fluidly connected with the hydraulic actuator and fluidly disconnected from the hydraulic circuit. In another configuration the hydraulic accumulator assembly is fluidly connected with the hydraulic circuit and fluidly disconnected from the hydraulic actuator. In another configuration the hydraulic accumulator assembly is fluidly disconnected from the hydraulic circuit and from the hydraulic actuator. In this way, the hydraulic accumulator assembly may be used particularly flexibly for powering or for additionally powering the hydraulic circuit and/or the hydraulic actuator. It is conceivable that the system may be switched to yet another configuration in which the hydraulic accumulator assembly is fluidly connected with both the hydraulic circuit and the hydraulic actuator.

The at least one actuator valve, preferably both the at least one actuator valve and the at least one circuit valve, may be configured to be controlled externally, in particular independently of a hydraulic pressure in the hydraulic circuit and in the hydraulic accumulator assembly. For example, the system may include a control unit for controlling the at least one actuator valve and/or the at least one circuit valve. The control unit typically comprises electronic circuitry, for example at least one microprocessor or at least one FPGA. The control unit may be configured to control the at least one actuator valve and/or the at least one circuit valve independently, for example through electromagnetic signals sent from the control unit to the at least one actuator valve and/or the at least one circuit valve. In case the at least one actuator valve and/or the at least one circuit valve are controllable through a hydraulic control circuit, this hydraulic control circuit is preferably fluidly isolated from the hydraulic circuit including the first and the second hydraulic displacement unit and from the hydraulic accumulator assembly.

The hydraulic accumulator assembly may comprise a high pressure hydraulic accumulator and a low pressure hydraulic accumulator. The at least one circuit valve may be configured to selectively fluidly connect at least one of the high pressure hydraulic accumulator and the low pressure hydraulic accumulator with the hydraulic circuit. Additionally or alternatively, the at least one actuator valve may be configured to selectively fluidly connect at least one of the high pressure hydraulic accumulator and the low pressure hydraulic accumulator with the hydraulic actuator. It is conceivable that the low pressure hydraulic accumulator is configured as (or replaced by) a low pressure fluid reservoir, for example a fluid reservoir at atmospheric pressure. However, typically the low pressure hydraulic accumulator is configured as a hydropneumatic accumulator with a minimum hydraulic pressure of at least 3 bar, of at least 5 bar or of at least 10 bar.

The control unit may be configured to control the at least one circuit valve to selectively fluidly connect the high pressure hydraulic accumulator with the hydraulic circuit and to selectively fluidly connect the low pressure hydraulic accumulator with the hydraulic circuit. Additionally or alternatively, the control unit may be configured to control the at least one actuator valve to selectively fluidly connect the high pressure hydraulic accumulator with the hydraulic actuator and to selectively fluidly connect the low pressure hydraulic accumulator with the hydraulic actuator.

The hydraulic circuit may comprise a first main fluid line fluidly connecting or selectively fluidly connecting a first fluid port of the first hydraulic displacement unit with a first fluid port of the second hydraulic displacement unit, and a second main fluid line fluidly connecting or selectively fluidly connecting a second fluid port of the first hydraulic displacement unit with a second fluid port of the second hydraulic displacement unit. The at least one circuit valve may then be configured to selectively:

fluidly disconnect the hydraulic accumulators from the hydraulic circuit, fluidly connect the high pressure hydraulic accumulator with at least one of the first main fluid line and the second main fluid line, and fluidly connect the low pressure hydraulic accumulator with at least one of the first main fluid line and the second main fluid line.

For example, the control unit may be configured to control the at least one circuit valve to selectively:
fluidly disconnect the hydraulic accumulators from the hydraulic circuit;
fluidly connect the high pressure hydraulic accumulator with the first main fluid line and fluidly connect the low pressure hydraulic accumulator with the second main fluid line while fluidly disconnecting the high pressure hydraulic accumulator from the second main fluid line and while fluidly disconnecting the low pressure hydraulic accumulator from the first main fluid line; and fluidly connect the low pressure hydraulic accumulator with the first main fluid line and fluidly connect the high pressure hydraulic accumulator with the second main fluid line while fluidly disconnecting the low pressure hydraulic accumulator from the second main fluid line and while fluidly disconnecting the high pressure hydraulic accumulator from the first main fluid line.

The series hydraulic hybrid system may comprise at least one accumulator pressure sensor configured to measure an accumulator pressure in the hydraulic accumulator assembly. The accumulator pressure sensor may be in communication with the control unit for sending measurement data to the control unit.

The hydraulic actuator may comprise a first fluid port and a second fluid port. The hydraulic actuator may be fluidly connected or selectively fluidly connected with the high pressure hydraulic accumulator through the first fluid port of the hydraulic actuator, and the hydraulic actuator may be fluidly connected or selectively fluidly connected with the low pressure hydraulic accumulator through the second fluid port of the hydraulic actuator. That is, the hydraulic actuator may be configured in such a way and may be in fluid communication or in selective fluid communication with the high pressure hydraulic accumulator and with the low pressure hydraulic accumulator in such a way that as the high pressure hydraulic accumulator and the low pressure hydraulic accumulator actuate the hydraulic actuator, for example by moving a movable member of the hydraulic actuator such as a piston or a shaft, fluid is displaced from the high pressure hydraulic accumulator to the hydraulic actuator and, simultaneously, fluid is displaced from the hydraulic actuator to the low pressure hydraulic accumulator.

For instance, the control unit may be configured to control the at least one actuator valve to selectively fluidly connect the high pressure hydraulic accumulator with the first fluid port of the hydraulic actuator and to selectively fluidly connect the low pressure hydraulic accumulator with the second fluid port of the hydraulic actuator.

The series hydraulic hybrid system may comprise a steering arrangement for steering a vehicle, wherein the hydraulic actuator is drivingly engaged with the steering arrangement for selectively actuating the steering arrangement. For example, the hydraulic actuator may include one or more steering cylinders. Typically, the steering arrangement comprises one or more shafts and one or more joints connected to one or more vehicle wheels.

The series hydraulic hybrid system may further comprise a hydraulic working pump fluidly connected or selectively fluidly connected with the hydraulic actuator for selectively pressuring the hydraulic actuator. The hydraulic working pump may be in fluid communication with the hydraulic actuator by means of a check valve, wherein the check valve is configured to allow a flow of fluid from the hydraulic working pump to the hydraulic actuator and to prevent a flow of fluid from the hydraulic accumulator assembly and/or from the hydraulic actuator to the hydraulic working pump so that the hydraulic working pump may be protected from high hydraulic pressures, in particular in the high pressure hydraulic accumulator. The hydraulic working pump may be drivingly engaged or selectively drivingly engaged with an engine. Also, the hydraulic working pump may be in fluid communication with a fluid reservoir, for example with a fluid reservoir at atmospheric pressure.

The series hydraulic hybrid system may include a control unit, for example the above-described control unit, wherein the control unit is configured to compare an accumulator pressure in the hydraulic accumulator assembly with a predetermined minimum actuator pressure. The control unit may further be configured to control the at least one actuator valve to selectively fluidly connect the hydraulic accumulator assembly with the hydraulic actuator if or when or once the accumulator pressure is above the minimum actuator pressure. Additionally or alternatively, the control unit may be configured to control the at least one actuator valve to selectively fluidly disconnect the hydraulic accumulator assembly from the hydraulic actuator if or when or once the accumulator pressure falls below the minimum actuator pressure. The minimum actuator pressure may be the minimum hydraulic pressure that is required to actuate the hydraulic actuator. For example, if the hydraulic actuator is drivingly engaged with a steering arrangement, the minimum actuator pressure may be the minimum hydraulic pressure which needs to be applied to the hydraulic actuator in order to steer the vehicle wheels, i. e. to change the orientation of the wheels with respect to a vehicle chassis.

The hydraulic working pump may have a variable hydraulic displacement. For example, the hydraulic working pump may have a movable swashplate or a bent axis design. In order to reduce the amount of energy consumed by the hydraulic working pump, the control unit may further be configured to reduce the hydraulic displacement of the hydraulic working pump when the hydraulic accumulator assembly is fluidly connected with the hydraulic actuator.

In order to guarantee a smooth connection/disconnection of the hydraulic accumulator assembly to/from the hydraulic actuator, the control unit may be configured to control the at least one actuator valve and the hydraulic working pump, in particular the hydraulic displacement of the hydraulic working pump and/or a rotational speed of the hydraulic working pump, such that a flow of fluid flowing from the hydraulic accumulator assembly and/or from the hydraulic working pump towards the hydraulic actuator and/or such that an actuator pressure acting on the hydraulic actuator remain/remains constant when the control unit fluidly connects/disconnects the hydraulic accumulator assembly with/from the hydraulic actuator. For example, if the hydraulic actuator is configured as a steering cylinder drivingly engaged with a steering arrangement for steering a vehicle, a smooth connection/disconnection of the hydraulic accumulator assembly to/from the hydraulic actuator guarantees a high degree of controllability and safety during a steering maneuver.

The series hydraulic hybrid system may further comprise an actuator pressure sensor for measuring an actuator pressure exerted on the hydraulic actuator and/or at least one flow sensor for measuring a flow of fluid between the hydraulic accumulator assembly and the hydraulic actuator. The actuator pressure sensor and/or the at least one flow sensor may be in communication with the control unit for sending measurement data to the control unit. For example, a first flow sensor may be configured to measure a flow of fluid flowing from the high pressure hydraulic accumulator to the hydraulic actuator, in particular to the first fluid port of the hydraulic actuator. Similarly, a second flow sensor may be configured to measure a flow of fluid flowing from the hydraulic actuator, in particular from the second fluid port of the hydraulic actuator, to the low pressure hydraulic accumulator.

The control unit may be configured to control the at least one actuator valve and the hydraulic working pump, in particular the hydraulic displacement of the hydraulic working pump and/or a rotational speed of the hydraulic working pump, based on at least one of the accumulator pressure, the actuator pressure, and the fluid flow between the hydraulic actuator and the hydraulic accumulator assembly.

Furthermore, a method of operating the above-described series hydraulic hybrid system is presently proposed, the method comprising the steps:
  comparing an accumulator pressure in the hydraulic accumulator assembly with a predetermined minimum actuator pressure, and
  if the accumulator pressure is above the minimum actuator pressure, and the user is requiring a movement of the hydraulic actuator, controlling the at least one actuator valve to fluidly connect the hydraulic accumulator assembly with the hydraulic actuator for pressurizing the hydraulic actuator.

When the hydraulic actuator comprises a steering cylinder drivingly engaged with a steering arrangement of a vehicle, the step of pressurizing the hydraulic actuator may include steering the vehicle, in particular changing an orientation of one or more vehicle wheels relative to a vehicle chassis.

The method may further include the step of reducing a pump rate of a hydraulic working pump in fluid communication with the hydraulic actuator for pressurizing the hydraulic actuator when or if the hydraulic accumulator assembly is fluidly connected with the hydraulic actuator. The pump rate of the hydraulic working pump may be measured in liters per second, for example. Reducing the pump rate of the hydraulic working pump may include reducing a hydraulic displacement of the hydraulic working pump.

The method may further include the steps of controlling the at least one actuator valve and/or a hydraulic working pump in fluid communication with the hydraulic actuator, in particular a hydraulic displacement of the hydraulic working pump and/or a rotational speed of the hydraulic working pump, such that a flow of fluid flowing from the hydraulic accumulator assembly and/or from the hydraulic working pump towards the hydraulic actuator and/or such that an actuator pressure acting on the hydraulic actuator remain/remains constant when the hydraulic accumulator assembly is fluidly connected with and/or fluidly disconnected from the hydraulic actuator.

The at least one actuator valve and/or the hydraulic working pump may be controlled based on at least one of or all of: an accumulator pressure in the hydraulic accumulator assembly, an actuator pressure acting on the hydraulic actuator, and a flow of fluid between the hydraulic accumulator assembly and the hydraulic actuator, in particular a flow of fluid from the high pressure hydraulic accumulator to the hydraulic actuator and/or a flow of fluid from the hydraulic actuator to the low pressure hydraulic actuator.

BRIEF DESCRIPTION OF THE DRAWINGS

An embodiment of the presently proposed series hydraulic system and method of operation is described in the following detailed description and depicted in the accompanying drawing in which:
  FIG. 1 shows an embodiment of a series hydraulic hybrid system.
  FIG. 1 shows an embodiment of a series hydraulic hybrid system 1. The system 1 may be arranged in an off-highway vehicle such as a wheel loader, a mining vehicle or a tractor.

The system 1 includes a hydraulic or hydrostatic circuit 2, a hydraulic actuator 4, a hydraulic accumulator assembly 5 including a high pressure hydraulic accumulator 5a and a low pressure hydraulic accumulator 5b, and a control unit 16.

DETAILED DESCRIPTION

The hydraulic circuit 2 comprises a first hydraulic displacement unit 6 in fluid communication with a second hydraulic displacement unit 7 through a first main fluid line 8 and through a second main fluid line 9. The first hydraulic displacement unit 6 comprises a hydrostatic pump such as an axial piston pump or a radial piston pump. The first hydraulic displacement unit 6 may have a variable hydraulic displacement. For example, the first hydraulic displacement unit 6 may comprise a movable swashplate. The second hydraulic displacement unit 7 comprises a hydrostatic motor such as an axial piston motor or a radial piston motor. The second hydraulic displacement unit 7 may have a variable hydraulic displacement. For example, the second hydraulic displacement unit 7 may comprise a movable swashplate. The first hydraulic displacement unit 6 is drivingly engaged or selectively drivingly engaged with an engine 10 such as an internal combustion engine (ICE) or an electric engine. The second hydraulic displacement unit 7 is drivingly engaged or selectively drivingly engaged with a vehicle output (not shown). The vehicle output may comprise a drive shaft, a final drive, a vehicle axle, and one or more wheels, for example.

The first main fluid line 8 selectively fluidly connects a first fluid port 6a of the first hydraulic displacement unit 6 with a first fluid port 7a of the second hydraulic displacement unit 7. The second main fluid line 9 selectively fluidly connects a second fluid port 6b of the first hydraulic displacement unit 6 with a second fluid port 7b of the second hydraulic displacement unit 7. The engine 10 may drive the second hydraulic displacement unit 7 by driving the first hydraulic displacement unit 6 and by transmitting energy from the first hydraulic displacement unit 6 to the second hydraulic displacement unit 7 through the hydraulic circuit 2, as is well known in the art of hydrostatic transmissions. Typically, the hydraulic or hydrostatic circuit 2 comprising the displacement units 6, 7 and the fluid lines 8, 9 is configured as a closed hydraulic circuit. For example, a minimum hydraulic pressure in the hydraulic circuit 2 may be at least 5 bar or at least 10 bar. However, it is likewise conceivable to replace the low pressure hydraulic accumulator 5b by a low pressure fluid reservoir which may be at atmospheric pressure.

The hydraulic accumulator assembly 5 is selectively fluidly connected with the hydraulic circuit 2 through circuit valves 12a, 12b, 13a, 13b and through fluid lines 11a, 11b, 14a, 14b, 15a, 15b. Here, the circuit valves 12a, 12b, 13a, 13b are configured as 2/2-way shut-off valves which may be switched between an open position and a closed position. The high pressure hydraulic accumulator 5a is selectively in fluid communication with the fluid line 8 through the fluid line 11a, the circuit valve 12a, and the fluid line 14a. The high pressure hydraulic accumulator 5a is selectively in fluid communication with the fluid line 9 through the fluid line 11a, the circuit valve 13a, and the fluid line 15a. The low pressure hydraulic accumulator 5b is selectively in fluid communication with the fluid line 9 through the circuit fluid line 11b, the circuit valve 13b, and the fluid line 15b. The low pressure hydraulic accumulator 5b is selectively in fluid communication with the fluid line 8 through the circuit fluid line 11b, the circuit valve 12b, and the fluid line 14b.

It is understood that the circuit valves 12a, 12b, 13a, 13b may include other combinations of valves configured to selectively fluidly connect the hydraulic accumulators 5a, 5b with the fluid lines 8, 9 of the hydraulic circuit 2.

The control unit 16 typically comprises electric circuitry. For example the control unit 16 may include a microprocessor or an FPGA. The control unit 16 is in communication with the circuit valves 12a, 12b, 13a, 13b (not shown) for controlling the circuit valves 12a, 12b, 13a, 13b, for example through electromagnetic signals. The control unit 16 is configured to control the circuit valves 12a, 12b, 13a, 13b to provide energy stored in the hydraulic accumulator assembly 5 to the hydraulic circuit and/or to absorb energy from the hydraulic circuit and to store the absorbed energy in the hydraulic accumulator assembly 5.

The control unit 16 may control the circuit valves 12a, 12b, 13a, 13b to fluidly disconnect the hydraulic accumulator assembly 5 from the hydraulic circuit 2. The control unit 16 may control the circuit valves 12a, 12b, 13a, 13b to fluidly connect the high pressure hydraulic accumulator 5a with one of the fluid ports 7a, 7b of the second hydraulic displacement unit 7 and, simultaneously, to fluidly connect the low pressure hydraulic accumulator 5b with the other one of the fluid ports 7a, 7b of the second hydraulic displacement unit 7. For example, when the hydraulic accumulator assembly 5 is fluidly connected with the hydraulic circuit 2, the hydraulic accumulator assembly 5 may drive or additionally drive the second hydraulic displacement unit 7 by displacing fluid from the high pressure hydraulic accumulator 5a to the low pressure hydraulic accumulator 5b through the second hydraulic displacement unit 7.

Also, the first hydraulic displacement unit 6 and/or the second hydraulic displacement unit 7 may be used to charge the hydraulic accumulator assembly 5. For example, the engine 10 may drive the first hydraulic displacement unit 6 to displace fluid from the low pressure hydraulic accumulator 5b to the high pressure hydraulic accumulator 5a. Additionally or alternatively, the second hydraulic displacement unit 7 may absorb energy from the vehicle output and may use the absorbed energy to displace fluid from the low pressure hydraulic accumulator 5b to the high pressure hydraulic accumulator 5a (regenerative braking). In both cases, a pressure gradient between the high pressure hydraulic accumulator 5a and the low pressure hydraulic accumulator 5b is increased.

The hydraulic actuator 4 is configured to convert a hydraulic pressure into a mechanical force and/or to convert a fluid flow into a linear motion or into a rotational motion of a rigid body. In the embodiment shown in FIG. 1 the hydraulic actuator 4 comprises a hydraulic cylinder and a piston 4c movable inside the cylinder. It is understood that the hydraulic actuator 4 could likewise include a hydraulic motor, for example. In the embodiment shown in FIG. 1 the system 1 further includes a steering arrangement 3. The steering arrangement 3 comprises one or more vehicle wheels and one or more shafts, wherein the one or more shafts are connected to the one or more wheels through one or more joints (not shown). The steering arrangement 3 is configured to steer the vehicle in which the system 1 is disposed. In particular, the steering arrangement 3 is configured to change the orientation of the one or more wheels of the steering arrangement 3 relative to a vehicle chassis. The hydraulic actuator 4 is drivingly engaged with the steering arrangement 3 for selectively actuating the steering arrangement 3. For example, the hydraulic actuator 4 may be drivingly engaged with one of the shafts of the steering arrangement 3.

The system 1 further comprises an actuator pressure sensor 23 fluidly connected to a load sensing port of the hydraulic actuator 4 and in communication with the control unit 16. For example, the actuator pressure sensor 23 may be configured to sense a pressure which is different from zero or which is above a predetermined threshold value when the wheels of the steering arrangement 3 are being steered.

The hydraulic actuator 4 has a first fluid port 4a and a second fluid port 4b. The fluid ports 4a, 4b are disposed on different sides of the piston 4c. The high pressure hydraulic accumulator 5a is selectively fluidly connected with the first fluid port 4a of the hydraulic actuator 4 through the fluid line 11a, a first actuator valve 17a, and a fluid line 18a. The low pressure hydraulic accumulator 5b is selectively fluidly connected with the second fluid port 4b of the hydraulic actuator 4 through the fluid line 11b, a second actuator valve 17b, and a fluid line 18a. Here, the first actuator valves 17a is configured as a 2/2-way shut-off valve which may be switched between an open position and a closed position, and the second actuator valve 17b is configured as a 3/2-way valve which may selectively fluidly connect the second fluid port 4b of the hydraulic actuator 4 with one of the low pressure hydraulic accumulator 5b and with a fluid reservoir 19 which may be at atmospheric pressure. It is understood that in an alternative embodiment the second actuator valve 17b may be configured as a 2/2-way valve having an open and a closed position, just like the first actuator valve 17a in FIG. 1. That is, in the alternative embodiment in which the second actuator valve 17b is configured as a 2/2-way valve there is no possibility of fluidly connecting the second fluid port 4b of the hydraulic actuator 4 with the fluid reservoir 19 through the second actuator valve 17b. It is understood that the actuator valves 17a, 17b could be replaced by other combinations of externally controllable valves configured to selectively fluidly connect the hydraulic accumulators 5a, 5b with the fluid ports 4a, 4b of the hydraulic actuator 4.

The circuit valves 12a, 13a and the actuator valve 17a are arranged in parallel with respect to the high pressure hydraulic accumulator 5a. In particular, the high pressure hydraulic accumulator 5a is directly fluidly connected with a fluid port of each one of the circuit valves 12a, 13a and of the actuator valve 17a. Similarly, the circuit valves 12b, 13b and the actuator valve 17b are arranged in parallel with respect to the low pressure hydraulic accumulator 5b. In particular, the low pressure hydraulic accumulator 5b is directly fluidly connected with a fluid port of each one of the circuit valves 12b, 13b and of the actuator valve 17b.

Thus, the accumulator assembly 5 is configured to be fluidly connected with the hydraulic actuator 4 or to be fluidly disconnected from the hydraulic actuator 4 through the actuator valves 17a, 17b independently of a state of the circuit valves 12a, 12b, 13a, 13b. In particular, the accumulator assembly 5 is configured to be fluidly connected with the hydraulic actuator 4 or to be fluidly disconnected from the hydraulic actuator 4 through the actuator valves 17a, 17b independently of whether the hydraulic accumulator assembly 5 is fluidly connected with or fluidly disconnected from the hydraulic circuit 2. Also, the control unit 16 is configured to control the actuator valves 17a, 17b independently of a hydraulic pressure in the hydraulic circuit 2 or in the accumulator assembly 5.

The hydraulic accumulator assembly 5 is in selective fluid communication with the hydraulic circuit 2 through the circuit valves 12a, 12b, 13a, 13b and with the hydraulic actuator 4 through the actuator valves 17a, 17b in such a way that the control unit 16 may selectively switch the system 1 between at least three configurations. In one configuration the hydraulic accumulator assembly 5 is fluidly connected with the hydraulic actuator 4 and fluidly disconnected from the hydraulic circuit 2. In another configuration the hydraulic accumulator assembly 5 is fluidly connected with the hydraulic circuit 4 and fluidly disconnected from the hydraulic actuator. In another configuration the hydraulic accumulator assembly 5 is fluidly disconnected from both the hydraulic circuit 2 and from the hydraulic actuator 4. It is conceivable that the control unit 16 is configured to switch the system 1 to yet another configuration in which the hydraulic accumulator assembly 5 is fluidly connected with both the hydraulic circuit 2 and with the hydraulic actuator 4.

The system 1 further comprises a hydraulic working pump 20 in fluid communication with the hydraulic actuator 4 for pressurizing or for selectively pressurizing the hydraulic actuator 4. In particular, the hydraulic working pump 20 may pressurize the hydraulic actuator to move the piston 4c of the hydraulic actuator. The hydraulic working pump 20 has a first fluid port 20a and a second fluid port 20b. The first fluid port 20a of the hydraulic working pump 20 is in fluid communication with the first fluid port 4a of the hydraulic actuator 4. In particular, the first fluid port 20a of the hydraulic working pump 20 is in fluid communication with the first fluid port 4a of the hydraulic actuator 4 through a check valve 21. The check valve 21 is configured to allow a flow of fluid from the hydraulic working pump 20 to the hydraulic actuator 4 and to block a flow of fluid from the hydraulic actuator 4 and/or from the high pressure hydraulic accumulator 5a to the hydraulic working pump 20, thereby protecting the hydraulic working pump 20 from high hydraulic pressures which could otherwise damage the hydraulic working pump 20. The second fluid port 20b of the hydraulic working pump 20 is in fluid communication with the fluid reservoir 19. The hydraulic working pump 20 may be drivingly engaged or selectively drivingly engaged with the engine 10, i.e. the hydraulic working pump 20 may be driven or selectively driven through the engine 10.

The hydraulic working pump 20 may have a variable hydraulic displacement. For example, the hydraulic working pump 20 may comprise a movable swashplate. However, it is understood that the hydraulic working pump 20 may comprise other known mechanisms for varying the hydraulic displacement of the hydraulic working pump 20. The control unit 16 may be in communication with the hydraulic working pump 20 for controlling a pump rate (measured, for example, in liters per second) of the hydraulic working pump 20, for example by controlling the hydraulic displacement of the hydraulic working pump 20.

The control unit 16 is configured to control the actuator valves 17a, 17b, for example through electromagnetic signals sent from the control unit 16 to the actuator valves 17a, 17b, to selectively fluidly connect/disconnect the hydraulic accumulator assembly 5 with/from the hydraulic actuator 4. In this way, hydraulic energy stored in the accumulator assembly 5 may be used or additionally used to pressurize the hydraulic actuator 4, for example for actuating the steering assembly 3. For instance, by fluidly connecting the high pressure hydraulic accumulator 5a with the first fluid port 4a of the hydraulic actuator 4 and by simultaneously fluidly connecting the low pressure hydraulic accumulator 5b with the second fluid port 4b of the hydraulic actuator, high pressure fluid may be displaced from the high pressure hydraulic accumulator 5a into the cylinder of the hydraulic actuator 4 through the first fluid port 4*a* of the hydraulic actuator 4 and low pressure fluid may be displaced from the cylinder of the hydraulic actuator to the low pressure hydraulic actuator 5*b* through the second fluid port 4*b* of the hydraulic actuator 4, thereby moving the piston 4*c* of the hydraulic actuator 4 in the downward direction in FIG. 4. The control unit 16 may be configured to fluidly connect the hydraulic accumulator assembly 5 with the hydraulic actuator 4 only if the actuator pressure sensor 23 detects that the steering arrangement 3 is being actuated by an operator of the vehicle.

It is understood that in an alternative embodiment not depicted here the high pressure hydraulic accumulator 5*a* may be selectively fluidly connected with both the first fluid port 4*a* and the second fluid port 4*b* of the hydraulic actuator, and that the low pressure hydraulic accumulator 513 may be selectively fluidly connected with both the first fluid port 4*a* and the second fluid port 4*b* of the hydraulic actuator, so that the accumulator assembly 5 may additionally be used to move the piston 4*c* in the upward direction in FIG. 1.

The system 1 further comprises a first pressure sensor 21*a* and a second pressure sensor 21*b* for measuring an accumulator pressure in the hydraulic accumulator assembly 5. In particular, the first pressure sensor 21*a* is configured to measure a pressure in the high pressure hydraulic accumulator 5*a*, and the second pressure sensor 21*b* is configured to measure a pressure in the low pressure hydraulic accumulator 5*b*. The measured accumulator pressure may include a pressure difference between a first (high) pressure measured by the first pressure sensor 21*a* and a second (low) pressure measured by the second pressure sensor 21*b*. The pressure sensors 21*a*, 21*b* are in communication with the control unit 16 (not shown) for transmitting measurement data from the pressure sensors 21*a*, 21*b* to the control unit 16.

The control unit 16 may be configured to control the circuit valves 12*a*, 12*b*, 13*a*, 13*b* and/or to control the actuator valves 17*a*, 17*b* based on the measured accumulator pressure. For example, the control unit 16 may be configured to compare the accumulator pressure with a predetermined minimum actuator pressure. The control unit 16 may then further be configured to control the actuator valve 17*a*, 17*b* to fluidly connect the hydraulic accumulator assembly 5 with the hydraulic actuator 4 if or once the accumulator pressure is above the minimum actuator pressure. Additionally or alternatively, the control unit 16 may be configured to control the actuator valve 17*a*, 17*b* to fluidly disconnect the hydraulic accumulator assembly 5 from the hydraulic actuator 4 if or once the accumulator pressure falls below the minimum actuator pressure. The minimum actuator pressure may be the minimum pressure that has to be applied to the hydraulic actuator 4 in order to actuate the steering arrangement 3. The minimum actuator pressure may depend on additional parameters which may include at least one of vehicle speed, tire pressure and steering angle. In this way, hydraulic energy stored in the accumulator assembly 5 may be used or additionally used to pressurize the hydraulic actuator 4 if the hydraulic energy stored in the accumulator assembly is sufficiently high to supplement or even to replace the energy provided to the hydraulic actuator 4 by the hydraulic working pump 20.

The control unit 16 may further be configured to reduce a pump rate of the hydraulic working pump 20, for example by reducing the hydraulic displacement of the hydraulic working pump 20, when or once the hydraulic accumulator assembly 5 is fluidly connected with the hydraulic actuator 4, in particular when the accumulator pressure is above the minimum actuator pressure. In this way, the power consumption of the hydraulic working pump 20 may be advantageously reduced.

In order to guarantee a smooth connection of the hydraulic accumulator assembly 5 to the hydraulic actuator 4 and a smooth disconnection of the hydraulic accumulator assembly 5 from the hydraulic actuator 4, the control unit 16 may be configured to control the actuator valves 17*a*, 17*b* and the hydraulic working pump 20, in particular the hydraulic displacement of the hydraulic working pump 20 and/or a rotational speed of the hydraulic working pump 20, such that a flow of fluid flowing from the hydraulic accumulator assembly 5 and/or from the hydraulic working pump 20 towards the hydraulic actuator 4 and/or such that an actuator pressure acting on the hydraulic actuator 4 remain/remains constant during the process of fluidly connecting the hydraulic accumulator assembly 5 to the hydraulic actuator 4 and/or during the process of fluidly disconnecting the hydraulic accumulator assembly 5 from the hydraulic actuator 4.

In other words, during the process of fluidly connecting the accumulator assembly 5 to the hydraulic actuator 4 and/or during the process of fluidly disconnecting the accumulator assembly 5 from the hydraulic actuator 4, the control unit 16 may control the actuator valves 17*a*, 17*b* and the pump rate of the hydraulic working pump 20 such that $$Q_{act} = Q_{acc} + Q_{wp} \approx \text{const};$$

where $Q_{act}$ is the total flow of fluid flowing to the hydraulic actuator 4, in particular to the first fluid port 4*a* of the hydraulic actuator 4 through the fluid line 18*a*; $Q_{acc}$ the flow of fluid flowing from the hydraulic accumulator assembly 5 to the hydraulic actuator 4, in particular from the high pressure hydraulic accumulator 5*a* to the first fluid port 4*a* of the hydraulic actuator; and Q is the flow of fluid flowing from the hydraulic working pump 20 to the hydraulic actuator 4, in particular to the first fluid port 4*a* of the hydraulic actuator 4; and const. is a constant fluid flow.

if the hydraulic actuator 4 is in driving engagement with a steering arrangement 3, as depicted in FIG. 1, the control unit 16 may be configured to calculate the value of const. based on a driver request. For example, the value of const. may be given by a predefined function $f(\phi,\dot\phi,v)$ of the required steering angle 4, the required steering rate 4), and the current vehicle speed v. The shape of $f(\phi,\dot\phi,v)$ then typically determines the response of the steering arrangement 3 and it may be defined based on the desired controllability of the steering arrangement 3.

The flow of fluid $Q_{acc,j}$ provided by the hydraulic accumulator assembly 5 during a time interval j (defined between time steps i−1 and i) may be given by:

$$Q_{acc,j} = V_i \left[ \left( \frac{p_i}{p_{i-1}} \right)^{1/\gamma} - 1 \right]$$

$$V_i = V_{i-1} - \Delta V_{j-1}$$

$$\Delta V_{j-1} = Q_{acc,j-1} \Delta t_{j-1},$$

where $V_i$ and $V_{i-1}$ denote the amount of fluid stored in the hydraulic accumulator assembly 5 at the beginning and at the end of the j-th time interval, respectively, $Q_{acc,j-1}$ denotes the flow of fluid provided by the hydraulic accumulator assembly 5 during the preceding time interval, $\Delta t_{i-1}$ denotes the duration of the preceding time interval, γ denotes the adiabatic exponent of the gas stored in the accumulator assembly 5 (for example, γ=1.4 for nitrogen), and $p_i$ and $p_{j-1}$ denote the pressure in the hydraulic accumulator assembly 5 measured at the beginning and at the end of the j-th time interval, respectively. It may then further be possible to calculate a value of the displacement a of the hydraulic working pump 20 that provides a smooth disconnection of the hydraulic accumulators 5a, 5b from the hydraulic actuator 4:

$$\alpha = \frac{1000\, Q_{wp}}{V_p \omega},$$

where $V_p$ denotes the known stroke of the hydraulic working pump 20 and w denotes the rotational speed of the hydraulic working pump 20.

If the hydraulic working pump 20 is commanded with a set point in pressure, a smooth disconnection of the accumulators 5a, 5b may be achieved more easily. In this case, the hydraulic working pump 20 may be controlled by communicating a pressure value to the hydraulic working pump 20, this pressure value matching the hydraulic pressure in the hydraulic accumulator assembly 5, in particular in the high pressure hydraulic accumulator 5a. For example, a smooth disconnection of the hydraulic accumulator assembly 5 from the hydraulic actuator 4 may be provided lithe pressure in the high pressure hydraulic accumulator 5a is low enough for the fluid flow generated by the high pressure hydraulic accumulator 5a to be lower than a maximum fluid flow the hydraulic working pump 20 may provide.

The embodiment displayed in FIG. 1 has been described for a single steering axle. However, the concept is modular and in alternative embodiments multiple steering axles available on the vehicle may be actuated by one or more hydraulic accumulators provided that the pressure and energy stored in the accumulators is high enough to move multiple steering cylinders.

The embodiment displayed in FIG. 1 comprises the steering arrangement 3 and the hydraulic accumulator assembly 5 including one high pressure hydraulic accumulator 5a and one low pressure hydraulic accumulator 5b. However, it is understood that in alternative embodiments multiple high pressure hydraulic accumulators and multiple low pressure hydraulic accumulators may be used. It is even conceivable that the system comprises multiple high pressure hydraulic accumulators which are precharged with different precharge pressures, and/or that the system comprises multiple low pressure hydraulic accumulators which are precharged with different precharge pressures. Multiple accumulators with a high pre-charge pressure (e.g. 100-140 bar) may be used to store more energy and thus provide more flow to command the hydraulic cylinder of the steering arrangement 3.

The invention claimed is:

1. A hydraulic hybrid system for a vehicle, comprising:
a first hydraulic circuit comprising:
  a first hydraulic displacement unit in fluid communication with a second hydraulic displacement unit, the first displacement unit connected to an engine;
a hydraulic actuator;
a hydraulic accumulator assembly selectively in fluid communication with the first hydraulic circuit via at least one circuit valve, and the at least one circuit valve controllable to allow fluid flow from the first hydraulic displacement unit to the hydraulic accumulator assembly and from the hydraulic accumulator assembly to the second displacement unit;

at least one actuator valve selectively connecting the hydraulic accumulator assembly with the hydraulic actuator to allow fluid flow from the hydraulic accumulator assembly to the hydraulic actuator, and the at least one actuator valve and the at least one circuit valve operating independently of one another;
a working pump fluidly connected with the hydraulic actuator for selectively pressurizing the hydraulic actuator; and
a control unit configured to control the at least one circuit valve, and configured to control the at least one actuator valve and the working pump such that an actuator pressure acting on the hydraulic actuator remains constant when the hydraulic accumulator assembly is fluidly connected with the hydraulic actuator and/or fluidly disconnected from the hydraulic actuator.

2. The hydraulic hybrid system of claim 1, wherein the at least one circuit valve and the at least one actuator valve are controllable in such a way that the hydraulic accumulator assembly is:
  a) selectively fluidly connected with the hydraulic actuator and fluidly disconnected from the first hydraulic circuit,
  b) selectively fluidly connected with the first hydraulic circuit and fluidly disconnected from the hydraulic actuator, and
  c) selectively fluidly disconnected from the first hydraulic circuit and fluidly disconnected from the hydraulic actuator.

3. The hydraulic hybrid system of claim 1, further comprising a vehicle output and the second hydraulic displacement unit is drivingly engaged or selectively drivingly engaged with the vehicle output.

4. The hydraulic hybrid system of claim 1, wherein the hydraulic accumulator assembly comprises a high pressure hydraulic accumulator and a low pressure hydraulic accumulator,
wherein the at least one circuit valve is configured to selectively fluidly connect the high pressure hydraulic accumulator with the first hydraulic circuit and to selectively fluidly connect the low pressure hydraulic accumulator with the first hydraulic circuit to drive fluid from the low pressure accumulator to the high pressure accumulator and to allow fluid flow from the high pressure accumulator, through the second displacement unit, to the low pressure accumulator, and/or
wherein the at least one actuator valve is configured to selectively fluidly connect the high pressure hydraulic accumulator with the hydraulic actuator and to selectively fluidly connect the low pressure hydraulic accumulator with the hydraulic actuator to allow fluid flow from the high pressure accumulator to the hydraulic actuator and from the hydraulic actuator to the low pressure accumulator.

5. The hydraulic hybrid system of claim 4,
wherein the first hydraulic circuit comprises a first main fluid line fluidly connecting or selectively fluidly connecting a first fluid port of the first hydraulic displacement unit with a first fluid port of the second hydraulic displacement unit,
wherein the first hydraulic circuit comprises a second main fluid line fluidly connecting or selectively fluidly connecting a second fluid port of the first hydraulic displacement unit with a second fluid port of the second hydraulic displacement unit, and
wherein the at least one circuit valve is configured to selectively:

fluidly disconnect the hydraulic accumulators from the first hydraulic circuit;

fluidly connect the high pressure hydraulic accumulator with the first main fluid line and fluidly connect the low pressure hydraulic accumulator with the second main fluid line while fluidly disconnecting the high pressure hydraulic accumulator from the second main fluid line and while fluidly disconnecting the low pressure hydraulic accumulator from the first main fluid line to allow fluid flow from the high pressure accumulator through the second displacement unit to the low pressure accumulator; and fluidly connect the low pressure hydraulic accumulator with the first main fluid line and fluidly connect the high pressure hydraulic accumulator with the second main fluid line while fluidly disconnecting the low pressure hydraulic accumulator from the second main fluid line and while fluidly disconnecting the high pressure hydraulic accumulator from the first main fluid line.

6. The hydraulic hybrid system of claim 4,
wherein the hydraulic actuator comprises a first fluid port and a second fluid port,
wherein the at least one actuator valve is configured to selectively fluidly connect the high pressure hydraulic accumulator with the first fluid port of the hydraulic actuator and to selectively fluidly connect the low pressure hydraulic accumulator with the second fluid port of the hydraulic actuator such that the actuator receives fluid from the high pressure accumulator and sends fluid to the low pressure accumulator.

7. The hydraulic hybrid system of claim 1, further comprising at least one accumulator pressure sensor configured to measure an accumulator pressure in the hydraulic accumulator assembly.

8. The hydraulic hybrid system of claim 1, further comprising a steering arrangement for steering a vehicle, wherein the hydraulic actuator is drivingly engaged with the steering arrangement for selectively actuating the steering arrangement, and
the first displacement unit is connected to an engine, and the second displacement unit is connected to a vehicle drive and the second displacement unit charges a low pressure accumulator of the hydraulic accumulator assembly during regenerative braking.

9. The hydraulic hybrid system of claim 1, wherein the working pump fluidly connected or selectively fluidly connected with the hydraulic actuator for selectively pressurizing the hydraulic actuator, wherein a check valve is configured to allow a flow of fluid from the working pump to the hydraulic actuator and to prevent a flow of fluid from the hydraulic accumulator assembly and from the hydraulic actuator to the working pump.

10. The hydraulic hybrid system of claim 1,
wherein the control unit is configured to compare an accumulator pressure with a predetermined minimum actuator pressure, and
wherein the control unit is configured to control the at least one actuator valve to fluidly connect the hydraulic accumulator assembly with the hydraulic actuator if the accumulator pressure is above the minimum actuator pressure, and/or
wherein the control unit is configured to control the at least one actuator valve to fluidly disconnect the hydraulic accumulator assembly from the hydraulic actuator if the accumulator pressure falls below the minimum actuator pressure.

11. The hydraulic hybrid system of claim 10,
wherein the working pump has a variable hydraulic displacement and wherein the control unit is configured to reduce the hydraulic displacement of the working pump when the hydraulic accumulator assembly is fluidly connected with the hydraulic actuator.

12. The hydraulic hybrid system of claim 1, further comprising an actuator pressure sensor for measuring the actuator pressure, wherein the control unit is configured to control the at least one actuator valve and the working pump based on an accumulator pressure and the actuator pressure.

13. A method of operating a hydraulic hybrid system for a vehicle, the method comprising the steps:
providing a hydraulic hybrid system for a vehicle, the hydraulic hybrid system comprising:
a first hydraulic circuit comprising:
a first hydraulic displacement unit in fluid communication with a second hydraulic displacement unit;
a hydraulic actuator;
a hydraulic accumulator assembly;
at least one controllable circuit valve;
at least one controllable actuator valve;
wherein the hydraulic accumulator assembly is selectively in fluid communication with the first hydraulic circuit by means of the at least one controllable circuit valve;
wherein the hydraulic accumulator assembly is selectively in fluid communication with the hydraulic actuator by means of the at least one controllable actuator valve, such that the hydraulic accumulator assembly is configured to be selectively fluidly connected with and to be selectively fluidly disconnected from the hydraulic actuator by means of the at least one actuator valve independently of a control position of the at least one circuit valve;
a variable hydraulic displacement working pump fluidly connected with the hydraulic actuator for selectively pressurizing the hydraulic actuator; and
a control unit configured to control the at least one circuit valve, and configured to control the at least one actuator valve and the displacement of the working pump such that an actuator pressure acting on the hydraulic actuator remains constant when the hydraulic accumulator assembly is fluidly connected with the hydraulic actuator and/or fluidly disconnected from the hydraulic actuator;
charging the hydraulic accumulator assembly with the first hydraulic displacement unit that is connected to an engine;
charging the hydraulic accumulator assembly with the second hydraulic displacement unit during regenerative braking;
driving the second displacement unit with the hydraulic accumulator assembly;
comparing an accumulator pressure in the hydraulic accumulator assembly with a predetermined minimum actuator pressure; and
if the accumulator pressure is above the minimum actuator pressure, controlling the at least one actuator valve to fluidly connect the hydraulic accumulator assembly with the hydraulic actuator for pressurizing the hydraulic actuator.

* * * * *